(12) United States Patent
Füglister

(10) Patent No.: US 7,040,802 B2
(45) Date of Patent: May 9, 2006

(54) STATIC MIXER FOR HIGH-VISCOSITY MEDIA EMPLOYING ARCUATE SEGMENTS FOR MOUNTING IN A SLEEVE

(75) Inventor: Alfred Füglister, Häuslenen (CH)

(73) Assignee: Sulzer Chemtech AG, Winterthur (CH)

( * ) Notice: Subject to any disclaimer, the term of this patent is extended or adjusted under 35 U.S.C. 154(b) by 161 days.

(21) Appl. No.: 10/699,988

(22) Filed: Nov. 3, 2003

(65) Prior Publication Data

US 2004/0114461 A1    Jun. 17, 2004

(30) Foreign Application Priority Data

Dec. 12, 2002   (EP) .................................. 02406099

(51) Int. Cl.
   *B01F 5/06* (2006.01)
(52) U.S. Cl. .................................................. 366/337
(58) Field of Classification Search ............. 366/181.5, 366/336, 337, 340; 138/37–40, 42; 48/189.4
   See application file for complete search history.

(56) References Cited

U.S. PATENT DOCUMENTS

| 1,778,790 | A | * | 10/1930 | Hans ........................... 48/189.4 |
| 3,460,580 | A | * | 8/1969 | Carter ........................... 138/42 |
| 4,466,741 | A | * | 8/1984 | Kojima ........................ 366/339 |
| 4,600,544 | A | * | 7/1986 | Mix ........................... 261/79.2 |
| 4,614,440 | A | * | 9/1986 | King ........................... 366/336 |
| 4,747,697 | A | * | 5/1988 | Kojima ........................ 366/339 |
| 5,104,233 | A | * | 4/1992 | Kojima ........................ 366/339 |
| 5,564,827 | A | * | 10/1996 | Signer ......................... 366/336 |
| 5,605,400 | A | * | 2/1997 | Kojima ........................ 366/339 |
| 5,865,537 | A | * | 2/1999 | Streiff et al. ............. 366/174.1 |
| 5,941,637 | A | * | 8/1999 | Maurer ........................ 366/337 |
| 6,109,781 | A | * | 8/2000 | Ogasawara et al. ......... 366/336 |
| 6,394,644 | B1 | * | 5/2002 | Streiff ......................... 366/337 |
| 6,769,801 | B1 | * | 8/2004 | Maurer et al. .............. 366/337 |
| 2001/0053108 | A1 | * | 12/2001 | Jahn et al. .................. 366/337 |
| 2002/0127112 | A1 | * | 9/2002 | Stowell et al. .......... 416/241 R |
| 2004/0114461 | A1 | * | 6/2004 | Fuglister .................... 366/337 |

FOREIGN PATENT DOCUMENTS

| CZ | 1707 | * | 6/1994 |
| DE | 4428813 A1 | * | 2/1996 |
| EP | 0063729 A2 | * | 11/1982 |
| EP | 0646408 A1 | * | 4/1995 |
| EP | 1099469 A1 | * | 5/2005 |

* cited by examiner

*Primary Examiner*—Charles E. Cooley
(74) *Attorney, Agent, or Firm*—Francis C. Hand; Carella, Byrne, Bain et al.

(57) ABSTRACT

The static mixer for a high-viscosity flowing fluid includes mixing elements which are made as monoliths and sleeve elements in the form of tube pieces by means of which the mixing elements are positioned as well as a housing into which the sleeve elements are inserted together with the mixing elements. The mixing elements each include a lattice structure of webs that cross. The sleeve elements have two cut-outs in the end faces that receive two ribs of the mixing elements in a shape-matched manner. The ribs are annular segments.

13 Claims, 3 Drawing Sheets

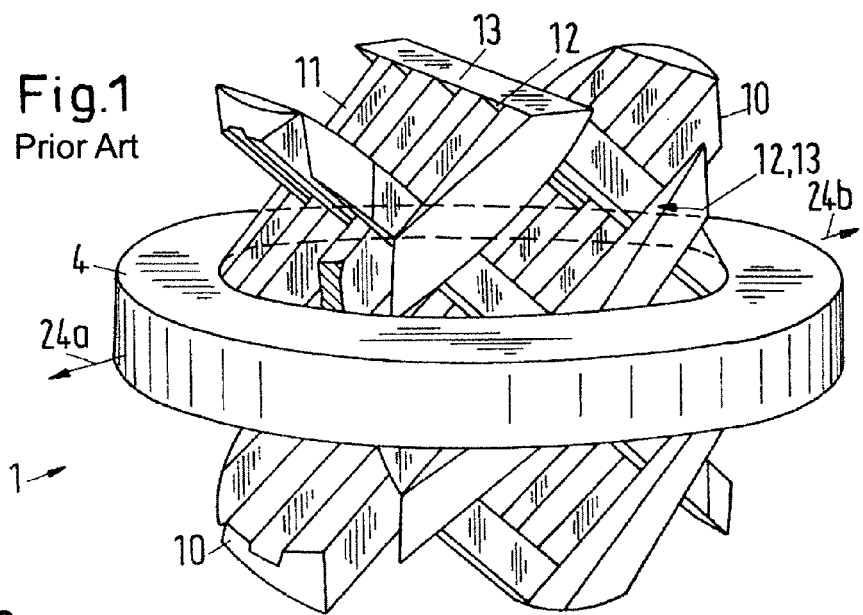
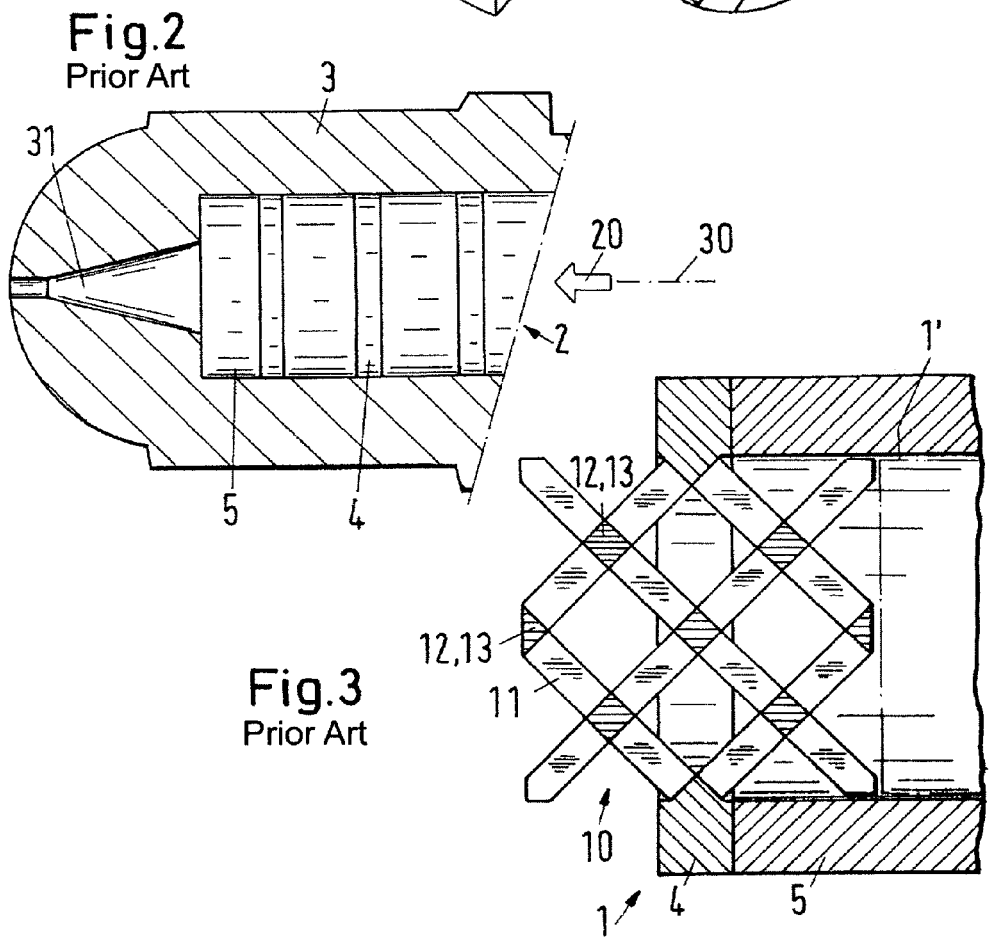

STATIC MIXER FOR HIGH-VISCOSITY MEDIA EMPLOYING ARCUATE SEGMENTS FOR MOUNTING IN A SLEEVE

The invention relates to a static mixer for high-viscosity media and to a mixing element for this mixer.

A static mixer is known from EP-A 0 646 408 with which high-viscosity polymer melts can be homogenised. This mixer can be used as a mixing head in the nozzle of an injection moulding machine or as a melt mixer subsequent to the screw of an extruder. It has a cylindrical shape and consists of a plurality of mixing elements as well as of sleeves which are inserted into the cylindrical hollow space of a housing. The mixing elements are cast bodies. They contain structures, for example lattice structures, which bring about a mixing process in a melt flowing through. The mixer structures shown in EP-A 0646 408 are built up of layers formed by webs. These layers are aligned in parallel in the direction of the longitudinal axis of the housing. The webs of adjacent layers cross. In a preferred embodiment, the sleeves form a tubular jacket together with flange-like rings of the mixer structures and the mixer structures are arranged successively in said jacket. In adjacent mixer structures, the orientations of the layers are each offset with respect to one another by a predetermined angle, preferably by 90°.

In injection moulding machines, polymer melts are injected into molds (the tools) at high pressure and in a pulsating manner. Injection molding machines have been further developed in a manner such that the throughputs and the injection pressures can be increased. Load peaks occur as a result of high alternating stresses which put a larger mechanical stress on the installed mixing elements.

Accordingly, It is the object of the invention to provide a static mixer which can cope better with the demands in the more modern injection moulding machines.

It is another object of the invention to avoid stress peaks in a static mixer during operation.

Briefly the invention provides a static mixer for a high-viscosity flowing fluid that includes a housing, a plurality of mixing elements, which are constructed as monoliths, i.e. one-piece bodies, and sleeve elements in the form of tube pieces by means of which the mixing elements are positioned within the housing.

The mixing elements each have a lattice structure that has webs that cross at crossing positions which are arranged on bar-like regions transversely to a main flow direction of the fluid, with the main flow direction being set by a longitudinal axis of the housing.

Each mixing element also has a pair of annular segments disposed on and projecting from opposite sides.

The sleeve elements are in contact at their ends with each other and receive the mixing elements via recesses in a mating relation. The annular segments of the mixing elements are laid in a shape-matching manner—in a shape complementary to the recesses.

Two end surfaces of each rib are arranged such that centers of the end faces can each be connected by lines which are at least approximately aligned like the bar-like regions of the crossing positions. These bar-like regions have cross-sectional surfaces which are not larger than radial cross-sectional surfaces of the ribs.

These and other objects and advantages of the invention will become more apparent from the following description taken in conjunction with the accompanying drawings wherein:

FIG. 1 illustrates a perspective view of a known mixing element;

FIG. 2 illustrates a part cross-sectional view of a nozzle with mixing head of a known static mixer;

FIG. 3 illustrates a longitudinal section through the mixing element of FIG. 1 and a sleeve element;

Figure 4:
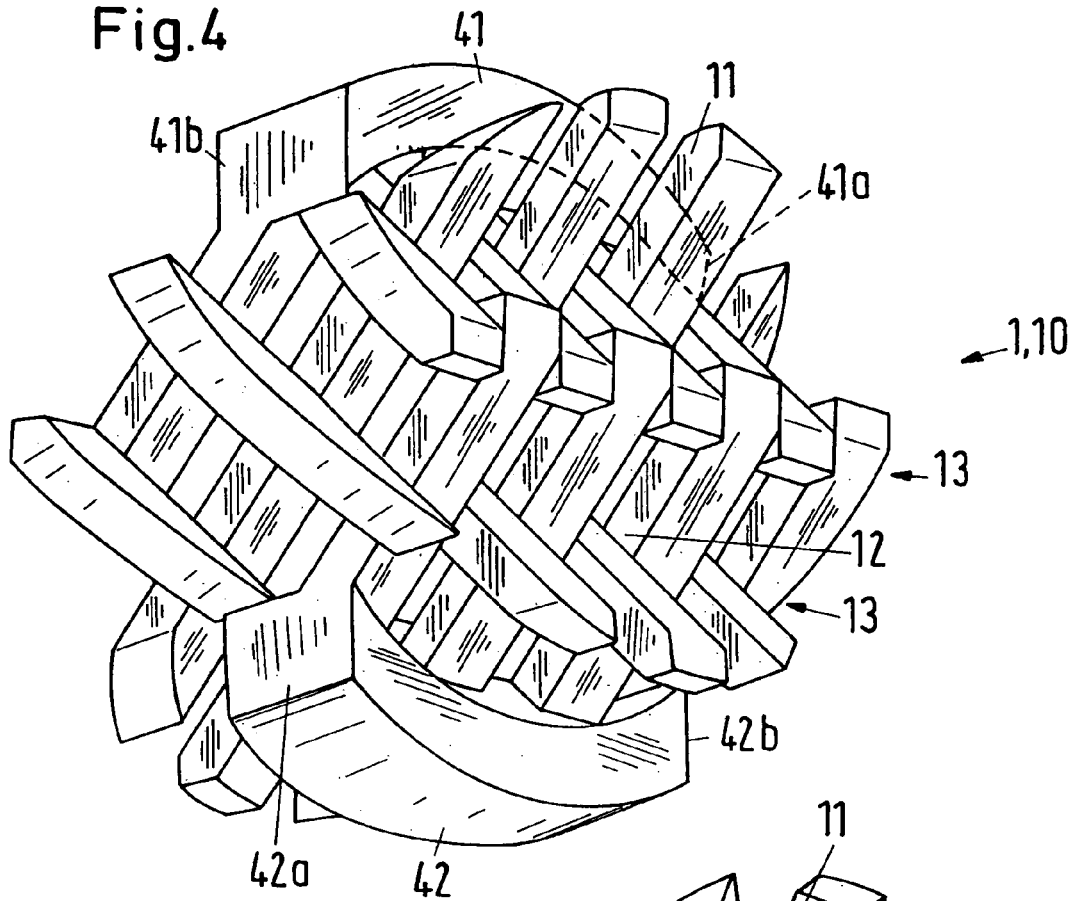
FIG. 4 illustrates a perspective view of a first mixing element in accordance with the invention.

Referring to FIG. 1, a known mixing element 1 effective for mixing includes a lattice-like mixer structure 10 and a ring 4 that form a monolithic body. The mixer structure 10 is made up of webs 11 arranged in layers. The webs 11 each have a rectangular or square cross-section. The layers are oriented parallel to one another in the main flow direction 30. The webs 11 of adjacent layers cross and enclose a uniform angle of 45° with respect to the main flow direction 30. This angle can have a value between 10 and 70°. The webs 11 of the mixer structure 10 cross at crossing positions 12 which are arranged at bar-like regions 13 transversely to the main flow direction 30.

Referring to FIGS. 1 and 3, the known mixing element 1 is made as a monolith and can be produced, for example, by mean of precision casting. In this method, a casting mold is formed with a wax body, a ceramic shell is applied to the wax body, and subsequently the wax is removed and the ceramic shell fired.

Referring to FIG. 2, a static mixer 2 that is provided for the homogenising of a high-viscosity fluid flow includes a housing 3 into which a plurality of the mixing elements are inserted together with sleeve elements 5 in the form of tube pieces. The mixing elements are positioned in alternating manner with the sleeve elements 5. As shown in FIG. 3, the ring 4 of a mixing element abuts the sleeve element 5 and has the same outer diameter as the sleeve 5.

The fluid to be homogenised, a polymer melt 20, flows through a static mixer in the housing 3 in a main flow direction 30 which is defined by a longitudinal axis of the housing 3.

In FIG. 2, the housing 3 is shown with the static mixer 2, namely a nozzle 31 with a mixing head such as is used in injection moulding machines. The static mixer 2 has an outer diameter which fits in a shape-matched manner into the cylindrical inner space of the housing 3.

FIG. 3 shows a longitudinal section through the mixing element 1 of FIG. 1 and through a part of a sleeve element 5. The outline of an adjacent mixing element 1' is shown—in part—in a chain dotted manner. The sectional area of this longitudinal section lies along the border between two adjacent layers. In this section, the bar-like regions 13 of the crossing positions 12 can be recognised as cross-sections. In the following, these regions are called "cross bars 13" in brief.

When using the static mixer 2 in an injection moulding machine, the mixing element 1 is exposed to a load which results in an anisotropic stretching behaviour due to the high pressure at which the polymer melt 20 has to be transported. Thus, the volume of the housing inner space increases. The mixing element 1 yields to the volume change in the direction transverse to the cross bar 13 (arrows 24a, 24b in FIG. 1). Deformation is substantially lower perpendicular to this direction, i.e. in the direction of the cross bar 13. A pulsation of the pressure results in a periodic change in shape of the mixing element 10 which is associated with high local stresses in the ring 4.

Referring to FIG. 4, a first mixing element 1 in accordance with the invention is constructed so that substantially lower load peaks occur during use. Whereas the known mixing element has a peripheral ring 4, in the new mixing element 1 has two diametrically disposed annular segments or ribs 41 and 42. This new geometry allows a stretching behaviour which—compared to that of the known mixing element 1 shown in FIG. 1—is much more even so that lower maximum stresses occur. The polymer melt 20 transported in a pulsating manner therefore exerts a less high material load with an increasing and decreasing pressure.

The mixing element is made as a one-piece body having a first plurality of ribs 11 disposed in spaced apart parallel layers angularly of a longitudinal axis; a second plurality of ribs 11 disposed in spaced apart parallel layers and in crossing relation to said first plurality of ribs, the ribs of the first plurality of ribs and the ribs of the second plurality of ribs form bar-like regions or cross-bars 13 transverse to the longitudinal axis; and a pair of diametrically disposed annular segments 41, 42 disposed on and projecting from opposite sides of body.

The annular segments 41, 41 are substantially parallel to the cross bars 13. Two flat end surfaces 41a, 41b or 42a, 42b respectively of the segments 41, 42 are each arranged such that centers of these end surfaces can be connected by lines which are aligned at least approximately the same as the cross bars 13. Radial cross-sectional surfaces of the segments 41, 42 are formed with larger cross-sectional surfaces than with the cross bars 13 for reasons of strength. As illustrated, the annular segments 41, 42 have a rectangular cross-section.

Figure 5:
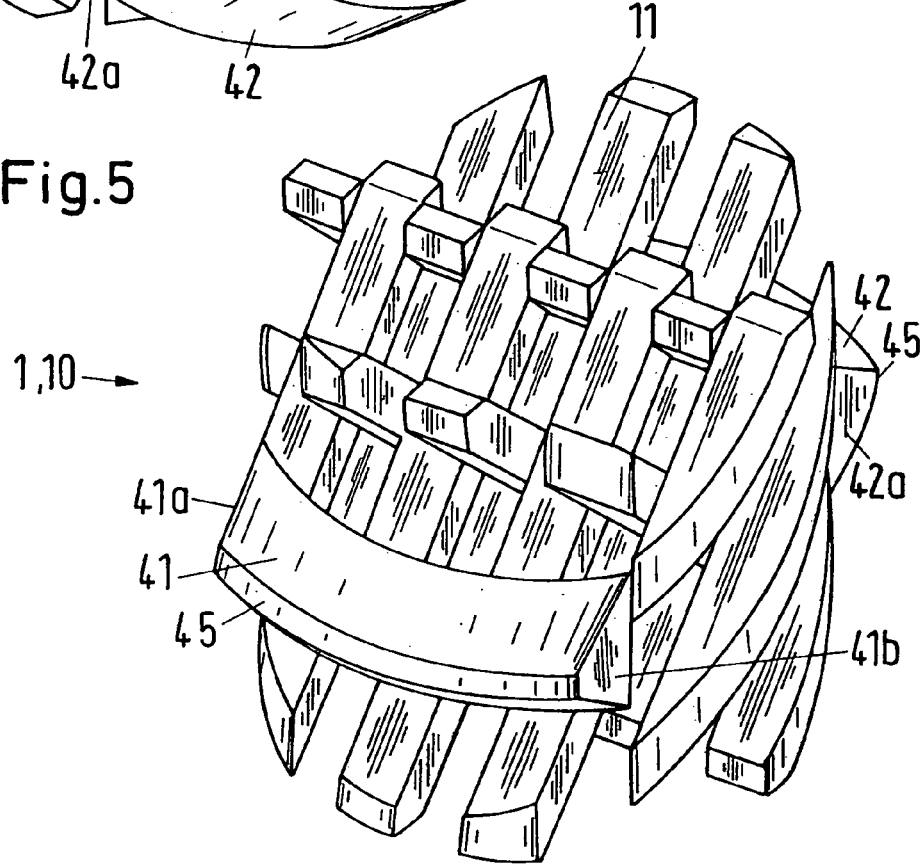
FIG. 5 illustrates a perspective view of a second mixing element in accordance with the invention.

Referring to FIG. 5, wherein like reference characters indicate like parts as above, the annular segments 41, 42 may have a wedge-shaped or trapezoidal cross-section with a flat apex 45.

Figure 6:
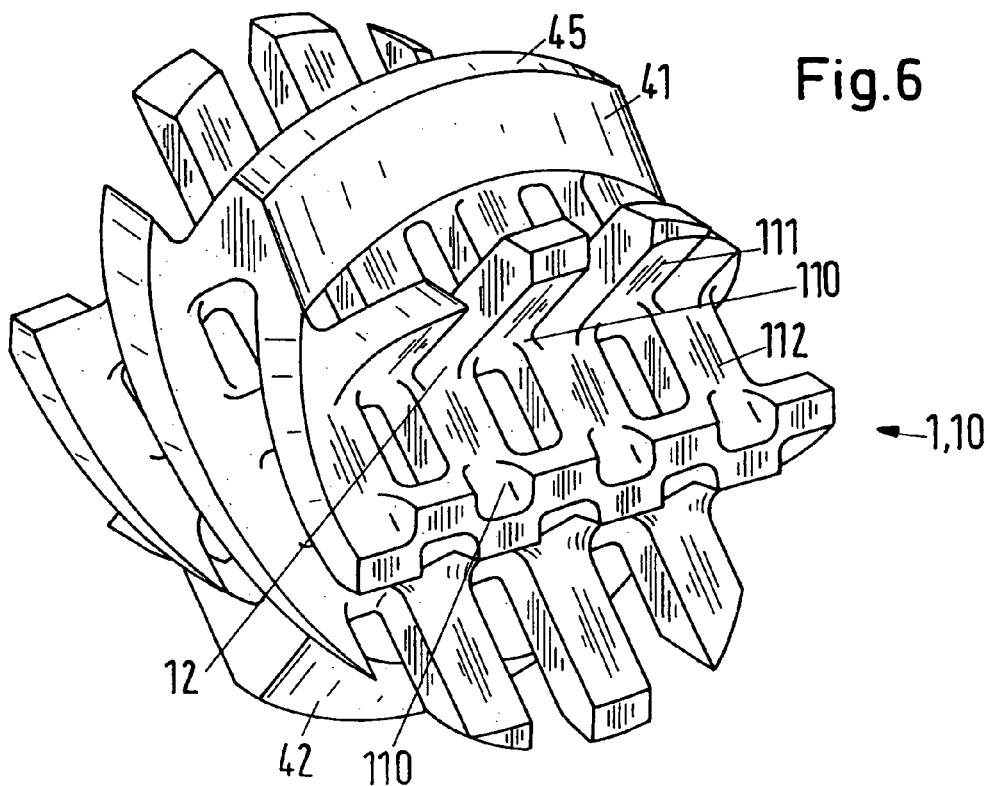
FIG. 6 illustrates a perspective view of a third mixing element in accordance with the invention.

Referring to FIG. 6, wherein like reference characters indicate like parts as above, the mixing element 1 of FIG. 5 may have corners that are formed, on the one hand, at the crossing positions 12 of the webs 11 and, on the other hand, at the connection positions of the webs 11 to the ribs 41, 42 as continuously curved transitions. In surrounding regions of these transitions, the webs 111 and 112 of the mixing element that stand transversely to one another are connected by round surface sections or transitions 110. The radii of curvature of these surface sections 110 are larger than around 10% of a diagonal web diameter. By rounding of the corners, stress peaks that would otherwise form in operation in the notch-like corners of the embodiment shown in FIG. 5, are substantially reduced.

Figure 7:
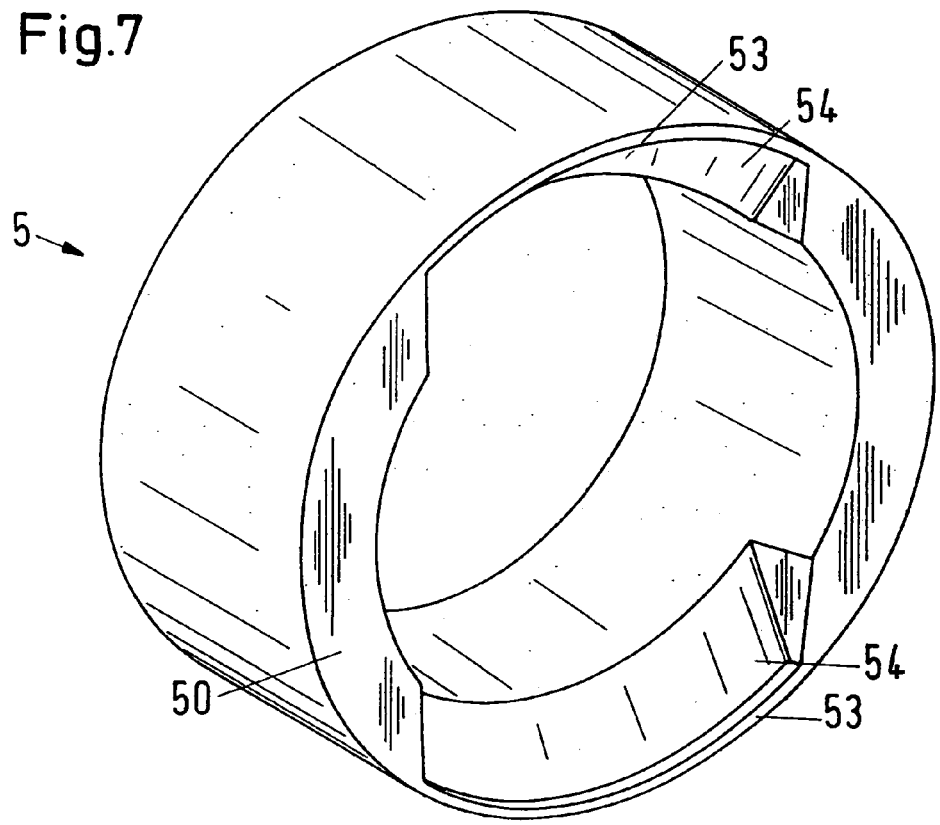
FIG. 7 illustrates a sleeve element for use with the mixing element of FIG. 6.

Referring to FIG. 7, a sleeve element 5 for the mixing element 1 of FIG. 6 has a smooth flat surface 50 at each end and a pair of wedge-shaped recesses or cut-outs 54 for the ribs 41, 42 in the flat surfaces 50. Further, these recesses 54 are restricted to regions which do not extend up to the inner wall of the housing 3. A small ridge 53 is thus formed at the outer periphery of the sleeve element 5 and screens the apex 45 of the wedge-shaped segments 41, 42 from contact with the housing 3. This is advantageous on the pushing in or pulling out of the mixer 2 into or out of the housing 3 since a jamming can no longer occur and thus an installation of the mixer is made substantially simpler.

Only one half of the wedge-like segments 41, 42 in each case comes to rest in the cut-outs 54 of the sleeve element 5. The other halves are received by adjacent sleeve elements (not shown). Adjacent sleeve elements 5 are in contact at their ends via the planar abutment surfaces 50.

In addition to the aforesaid measures with which the mechanical stability of the mixing element 1 is improved (namely annular segments and rounded corners), the choice of an ideal material is also a further means towards the same purpose. INCONEL, in particular IN718, is advantageously used as a casting material for the mixing elements 1. The sleeve elements 5 can be produced to exact dimensions from a heat-treatable steel.

The annular segments 41, 42 of the cast mixing element 1 can be reworked by grinding at their surfaces. The purpose of such a rework is to obtain an exact shape match in the cut-outs 54 of the sleeve elements 5.

The invention claimed is:

1. A static mixer for a high-viscosity flowing fluid with mixing elements which are made as monoliths, with sleeve elements in the form of tube pieces by means of which the mixing elements are positioned, and with a housing into which the sleeve elements are inserted together with the mixing elements, with the mixing elements each including a lattice structure, webs of this lattice structure crossing at crossing positions which are arranged at bar-like region transversely to a main flow direction of the fluid, and the main flow direction being given by a longitudinal axis of the housing, characterised in that the sleeve elements are in contact at their ends via abutment surfaces; in that cut-outs exist at these ends into which two annular segments of the mixing elements are inserted in a shape-matched manner to the cut-outs; in that two end surfaces of each segment are each arranged such that centers of the end surfaces can each be connected by lines which are aligned at least approximately the same as the bar-like regions of the crossing positions; and in that these bar-like regions have cross-sectional surfaces which are not larger than radial cross-sectional surfaces of the ribs.

2. A mixer in accordance with claim 1, characterised in that the webs each have a rectangular cross-section; in that transitions are formed at the crossing positions of the webs and at the connection positions of the webs to the ribs such that surface elements standing transversely to one another are connected by rounded surface sections in surrounding regions of the transitions; and in that the radii of curvature of these surface sections are larger than 10% of a diagonal diameter of the webs.

3. A mixer in accordance with claim 1, characterised in that radial cross-sectional surfaces of the ribs are wedge-shaped, with an apex of the wedge shape being directed to the outside.

4. A mixer in accordance with claim 1 characterised in that the cut-outs for the segments are restricted to regions which do not extend up to an inner wall of the housing.

5. A mixing element for a mixer in accordance with claim 1.

6. A mixing element in accordance with claim 5, characterised in that the segments of the mixing element are reworked by grinding at their surfaces for the purpose of producing a precise shape match in the cut-outs of the sleeve elements.

7. A one-piece body forming a mixing element for a static mixer, said body having
a first plurality of ribs disposed in spaced apart parallel layers angularly of a longitudinal axis;
a second plurality of ribs disposed in spaced apart parallel layers and in crossing relation to said first plurality of ribs, said ribs of said first plurality of ribs and said ribs of said second plurality of ribs forming bar-like regions transverse to said longitudinal axis; and a pair of annular segments disposed on and projecting from opposite sides of said body, said segments being peripherally spaced apart to define gaps therebetween.

8. A one-piece body as set forth in claim 7 wherein said body is a cast body made of INCONEL IN 718.

9. A one-piece body as set forth in claim 7 wherein each rib has a rectangular cross-section and wherein said body has rounded transitions connecting adjacent ribs.

10. A one-piece body as set forth in claim 7 wherein each annular segment has a wedge-shaped cross-section.

11. A static mixer comprising a plurality of mixing elements, each element comprising a one-piece body having a first plurality of ribs disposed in spaced apart parallel layers angularly of a longitudinal axis; a second plurality of ribs disposed in spaced apart parallel layers and in crossing relation to said first plurality of ribs, said ribs of said first plurality of ribs and said ribs of said second plurality of ribs forming bar-like regions transverse to said longitudinal axis; and a pair of annular segments disposed on and projecting from opposite sides of said body; and a plurality of sleeve elements disposed in alternating relation with said mixing elements along said longitudinal axis, each said sleeve element having a pair of oppositely disposed recesses in each side thereof receiving said annular segments of an adjacent mixing element, each said sleeve being in contact with an adjacent sleeve.

12. A static mixer as set forth in claim 11 wherein each rib has a rectangular cross-section and wherein said mixing element has rounded transitions connecting adjacent ribs.

13. A one-piece body as set forth in claim 11 wherein each annular segment has a wedge-shaped cross-section.

\* \* \* \* \*